Figure 1:
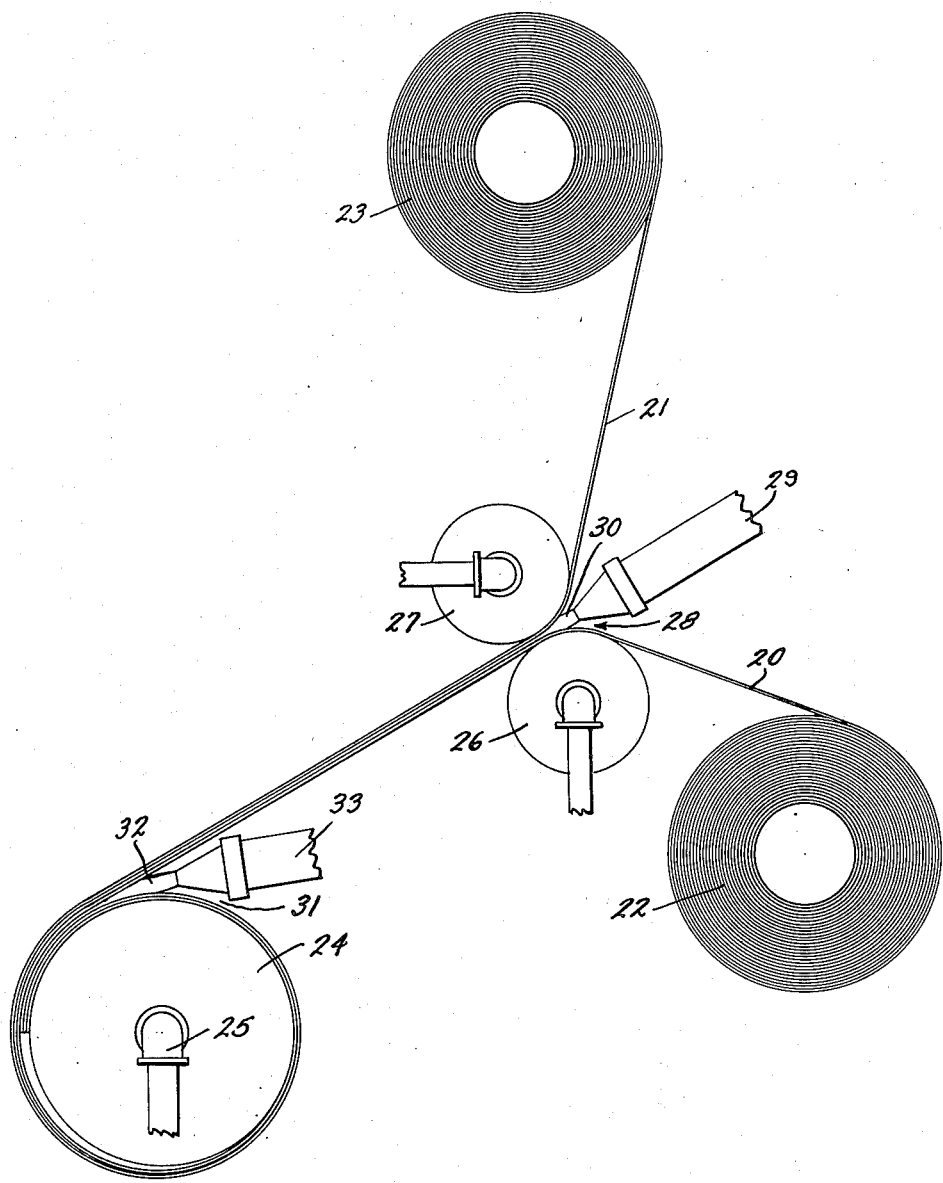

Jan. 9, 1951  G. A. LYON  2,537,311
METHOD OF AND APPARATUS FOR FORMING PLASTIC
Original Filed Dec. 22, 1945

Inventor
GEORGE ALBERT LYON
by [signature] Attys

Patented Jan. 9, 1951

2,537,311

UNITED STATES PATENT OFFICE 2,537,311

METHOD OF AND APPARATUS FOR FORMING PLASTIC

George Albert Lyon, Detroit, Mich.

Original application December 22, 1945, Serial No. 636,875. Divided and this application October 2, 1947, Serial No. 777,381. In Canada June 24, 1946

5 Claims. (Cl. 18—5)

This invention relates to the forming of plastic and more particularly to the forming of flat plastic articles such as sheet and the like.

This invention has been divided from my copending application, U. S. Serial No. 636,875, filed December 22, 1945, now Patent No. 2,528,529.

An object of this invention is to provide an improved method of and apparatus for forming plastic articles, such as sheet, from a plastic mix.

Another object of this invention relates to the provision of a new way of forming plastic from plastic mix by the use of endless belts having polished surfaces.

Yet another object of this invention relates to the provision of a new method of and apparatus for forming continuous sheets of plastic in a simple and economical manner.

In accordance with the general features of this invention, there is provided a plurality of cooperable belts having highly polished surfaces, a pressure means for forcing them into cooperation and means for delivering plastic mix between the belts prior to their being pressed together whereby the mix may be formed into continuous plastic sheets.

In accordance with other features of this invention there is provided novel plastic forming apparatus embracing cooperable belts pressed together with plastic therebetween so as to be wound on a common drum or mandrel in multiple layers and on which drum the plastic may be later cooled.

Other objects and features of this invention will more fully appear from the following detailed description taken in connection with the accompanying drawings which illustrate a single embodiment thereof and in which Figure 1 is a diagrammatic view illustrating an apparatus embracing the features of this invention and capable of practicing my novel method.

As shown on the drawings:

The reference characters 20 and 21 designate cooperable metal sheet belts of any suitable width and length depending upon the dimensions of the sheet desired.

These belts 20 and 21 may be made of any suitable material, preferably metal, and excellent results may be obtained by making them of stainless steel strip having at least one highly polished surface. Each of the belts is adapted to be pulled from a supply drum; the belt 20 being drawn from a supply drum 22 and the belt 21 being drawn from a supply drum 23. I employ a cylindrical positively driven drum 24 for pulling both of the belts 20 and 21 from their respective supply drums 22 and 23.

The two belts 20 and 21 are adapted to be wound together in layer fashion upon the driven drum 24, which may be suitably heated. Any suitable heating medium supplied, as for example, through a pipe 25, may be employed for this purpose. It will, of course, be appreciated, as is well known in the rotating drum art that the heating connection 25, as well as the heating connection 14 in Figure 1, should be so arranged as to not interfere with the rotation of the drum. The swivel fittings or joints may be employed for this purpose in a manner well known to those familiar with this art.

In order to press the divergent belts 20—21 together, there is provided a pair of pressure rollers or drums 26—27, which may be likewise suitably heated. These cooperating pressure rollers or drums 26—27 may be suitably driven and are adapted to press together the two belts 20 and 21 as they converge at the pressing area. It is, of course, clear that the two belts 20—21 by reason of their angular relationship, define a space at 28 into which plastic 30 may be introduced between the polished surfaces of the two belts 20—21. Any suitable means may be employed to introduce hot or flowable plastic between the belts, as, for example, an extruder 29.

The plastic thus delivered between the belts at the pressure area is flattened into smooth sheet-like form; such flattened plastic taking the smooth finish of the cooperating finished surfaces of the two belts. The belts in leaving the pressure roller are, together with the flattened plastic, wound up on the drum 24. It will be noted that the belts contact the periphery of the drum 24 at an angle so that a space 31 is provided at the junction of the plies of the belt and plastic and the wound-up portions of the belts on the drum.

In this space I propose to insert an additional mass of plastic 32. This may be effected by an extruder or the like 33. Thus, at the same time as the belts and the intermediate sheet of plastic are being wound up on the drum 24, an additional sheet of plastic may be introduced between the mass and wound-up on the drum. If this additional extruder 33 is employed, it is, of course, necessary that both sides of the belt be highly finished so that a smooth finish will be imparted to the plastic mass 32 as it is flattened into sheet form.

After the belts 20 and 21 have been completely withdrawn from the supply drums 22 and 23 and wound up on the drum 24, the drum with the wound-up plies of belt and plastic thereon may be cooled until the plastic has taken a set. Thereafter the belting is pulled off the drum and the plastic sheeting is stripped from the two belts as the belts are being separated in their withdrawal from the drum. In withdrawing them from the drum 24, the belts 20 and 21 may be rewound in any suitable way on supply drums ready for reuse in subsequent plastic forming operations.

It is believed that my novel method of forming plastic will be fully understood from the aforesaid description of an apparatus for practicing the method.

It is understood that my process is particularly adapted for the forming of synthetic thermoplastic material, such, for example, as ethyl cellulose or a vinyl resin of which there are many different compounds now on the market.

Also if it is so desired, depending upon the type of plastic being treated, a lubricating fluid of the type used in the plastic industry may be used on the polished surfaces of the belts to facilitate subsequent stripping of the flattened plastic therefrom.

I claim as my invention:

1. In a method of forming plastic sheeting the steps of extruding plastic material between a pair of forming belts, pressing said belts together, winding said belts about a heated drum, and extruding additional plastic material into the juncture space at convergence of the belts with said heated drum.

2. In a plastic forming machine, cooperable belts having highly polished surfaces engageable with each other, spaced supply drums from which said belts are separately pulled, a common heated driven drum about which converging portions of said belts are wound as they are pulled from the supply drums, pressure means between said supply drums and the driven drum for pressing the belts together, means for delivering plastic material between the belts before the belts are pressed together, whereby the plastic is flattened into continuous sheet form as it is wound up about the driven drum, and plastic supply means for delivering plastic between the plies wound up on the driven drum whereby a second layer of plastic may be flattened around and between the layers of belts wound up on said driven drum.

3. In a plastic forming machine cooperable belts, a pair of spaced supply drums from each of which a belt is withdrawn towards the other belt, a common drum for withdrawing in a common direction said belts from said supply drums and about which common drum the belts are wound, said common drum being positively driven, pressure means for converging and pressing the belts together in advance of their being wound upon the common drum, said converging belts in advance of said pressure means defining a plastic supply area in which plastic may be introduced for pressing into sheet form between said pressure means and for winding up on the common drum along with the belt, means for delivering extruded plastic between said pressure means in advance of the same, and additional extruding means for delivering plastic between the common drum and the plies of belts being wound up thereon.

4. A method of making thermoplastic sheet which comprises the steps of moving metal forming belts into convergence, heating said belts, introducing thermoplastic material into the convergence of the belts, winding the belts with the thermoplastic material therebetween about a heated drum, completing the winding of the belts with thermoplastic material therebetween about said drum, cooling the drum and the belts with the thermoplastic material therebetween to set the thermoplastic material, and unwinding the belts from the drum and stripping the set thermoplastic sheet from between the belts.

5. In a method of forming plastic sheet from thermoplastic material, the steps of unwinding separate metallic forming belts from supply rolls, bringing the belts into convergence, heating the belts where they converge, introducing thermoplastic material between the converging belts, winding the heated belts with the thermoplastic material therebetween about a heated drum, at the convergence of the belts with thermoplastic material therebetween with the heated drum introducing a second layer of thermoplastic material, completing the winding of the belts and thermoplastic material about the heated drum, cooling the drum and the belts and the thermoplastic material therebetween, and unwinding the belts from the drum and stripping the set thermoplastic sheet therefrom.

GEORGE ALBERT LYON.

REFERENCES CITED

The following references are of record in the file of this patent:

UNITED STATES PATENTS

| Number | Name | Date |
| --- | --- | --- |
| 986,162 | Gare | Mar. 7, 1911 |
| 1,510,237 | Maxwell | Sept. 30, 1924 |
| 1,611,400 | Andrews | Dec. 21, 1926 |
| 1,924,635 | Buffington | Aug. 29, 1933 |
| 2,075,735 | Loomis | Mar. 30, 1937 |
| 2,121,872 | Hazell et al. | June 28, 1938 |
| 2,246,987 | Roos | June 24, 1941 |
| 2,371,074 | Spencer | Mar. 6, 1945 |